United States Patent [19]

Jackson et al.

[11] Patent Number: 5,344,800
[45] Date of Patent: Sep. 6, 1994

[54] PLASTIC REFRACTORY COMPOSITIONS HAVING IMPROVED FLOWABILITY

[75] Inventors: Cheryl L. Jackson, Mexico; John Y. Liu, Columbia, both of Mo.

[73] Assignee: A.P. Green Industries, Inc., Mexico, Mo.

[21] Appl. No.: 75,166

[22] Filed: Jun. 10, 1993

[51] Int. Cl.$^5$ .............................................. C04B 35/52
[52] U.S. Cl. ........................................ 501/90; 501/100
[58] Field of Search ............... 501/94, 99, 100, 127, 501/90; 427/422, 426, 427

[56] References Cited

U.S. PATENT DOCUMENTS

| | | | |
|---|---|---|---|
| 3,285,760 | 11/1966 | Hildinger et al. | 106/58 |
| 3,427,369 | 2/1969 | Parsons | 264/30 |
| 3,552,984 | 1/1971 | Martinet et al. | 106/56 |
| 3,649,313 | 3/1972 | Fisher | 106/56 |
| 3,846,144 | 11/1974 | Parson et al. | 106/56 |
| 4,210,454 | 7/1980 | Rechter | 106/56 |
| 4,226,625 | 10/1980 | Delcorio et al. | 106/38.22 |
| 4,233,079 | 11/1980 | Rechter | 106/56 |
| 4,298,391 | 11/1981 | Hayase et al. | 501/89 |
| 4,307,197 | 12/1981 | Daniel et al. | 501/100 |
| 4,387,173 | 6/1983 | Henry, Jr. et al. | 524/63 |
| 4,461,789 | 7/1984 | Takashima | 427/426 |
| 4,535,001 | 8/1985 | Greener | 427/180 |
| 4,539,301 | 9/1985 | Kaneko et al. | 501/99 |
| 4,634,603 | 1/1987 | Gruss et al. | 427/96 |
| 4,640,848 | 2/1987 | Cerdan-Diaz et al. | 427/426 |
| 4,780,142 | 10/1988 | Rechter | 106/84 |
| 4,810,537 | 3/1989 | Davis et al. | 427/422 |
| 4,952,534 | 8/1990 | Davis et al. | 501/94 |
| 5,147,834 | 9/1992 | Banerjee | 501/129 |

FOREIGN PATENT DOCUMENTS

| | | |
|---|---|---|
| 010345 | 10/1978 | European Pat. Off. |
| 785275 | 12/1978 | U.S.S.R. |

*Primary Examiner*—Karl Group
*Assistant Examiner*—A. Wright
*Attorney, Agent, or Firm*—Senniger, Powers, Leavitt & Roedel

[57] ABSTRACT

Improved gunnable plastic refractory compositions consist of a mass of friable clusters of granular material which has a moisture content of from about 4% to about 10% by weight of the total composition and contains from about 0.05% to about 0.5% by weight (added), preferably 0.1% to 0.3%, of a hydrocolloid selected from the class consisting of a polysaccharide ether and xanthan gum and from about 0.05% to about 1.0% by weight (added), preferably 0.15% to about 0.50%, carbon.

18 Claims, No Drawings

PLASTIC REFRACTORY COMPOSITIONS HAVING IMPROVED FLOWABILITY

This invention relates to improving the flowability of gunning formulations of plastic refractory compositions by the addition of a small amount of carbon to such compositions.

BACKGROUND OF THE INVENTION

A plastic refractory is a moist, pliable mixture of aggregates and binders which when applied to a furnace wall or the like and fired in place forms a hard, monolithic, refractory lining for the substrate. Plastic refractory compositions are manufactured in granular form and in slab form. Both forms have been and still are placed by ramming the plastic masses onto the substrate to knead and knit them together and form a monolithic lining. Ramming is labor intensive and much care must be taken to avoid lamination of the plastic masses which would shorten the useful life of the refractory lining. Granular plastic refractories may also be formulated as gunning compositions.

The gunning of granular plastic refractories has the advantages of being potentially less labor intensive and of forming non-laminar linings. The potential for savings in labor costs is reduced in some circumstances by the large amount of refractory material that rebounds from the surface being covered. Also, the larger pieces of aggregate may be lost by rebounding while the smaller ones remain, resulting in the emplacement of a refractory lining widely different in composition than the starting material. In some cases the rebounded material can be recovered and reworked into a pliable mass but oftentimes the rebounded material is not usable because of contamination. In either circumstance, time is lost in recovering the rebounded material and in gunning for a longer period to build up the desired thickness. Moreover, the very nature of the plastic refractory makes it susceptible to compaction during storage and even during shipment. Thus, a plastic refractory which has been granulated for application by the gunning technique may not be in gunnable condition at the site because of compaction. Also, attempts to minimize the amount of rebound by increasing the amount of water in the refractory mixture have often had the undesirable effect of causing the mixture to cling to the internal surfaces of the delivery hoses and pumps of the gunning apparatus and eventually clogging the apparatus, thereby causing work stoppages.

A recent solution to the problem of maintaining the flowability of plastic gunning compositions during their application is disclosed in U.S. Pat. No. 4,952,534, incorporated herein by reference, which teaches that the flowability of such compositions may be improved by the addition of a hydrocolloid to the gunning mix resulting in smoother flow through the gunning apparatus and a decrease in rebounds. Nevertheless, while the addition of a hydrocolloid alone is usually sufficient under most conditions to insure acceptable gunning characteristics for most refractory gunning plastic compositions, it has now been found that in some situations certain compositions, even though containing a hydrocolloid, are more sensitive to manufacturing and use site variables resulting in poor and irregular flow characteristics of those compositions.

More particularly, it has been noted that in gunning operations, as the granulated plastic moves through the gun and hoses during installation, the effect of friction increases the temperature of the inner surfaces of the feedwheel, pockets, gun coupling and hoses. Gunning plastic compositions are composed of many ingredients of various particle sizes. The finer sized portion, generally composed of alumina, clay and bonding agent, make up a coating that surrounds the coarse aggregate. Due to their larger amount of surface area the finer sized materials of the mix are more reactive than the coarser grains. Further, the finer sized portion of the mix is also the first material to come into contact with the hot surfaces of the gun and hose. As more and more material is gunned, the finer portion can begin to harden on the interior metal parts of the gunning system. This in turn attracts more of the finer material creating a layered effect. As each layer forms coarser grains can become trapped in the coating which is formed forming a hardening, sticky blockage. Additionally, in so called fast-fire versions of these mixes, the fibers which are added to provide the fast-fire feature also become trapped in the coating and can form a layer comprised of an interlocking weave of fines, fibers and aggregate. Over time, these layers build up until excessive pressure is required to force the gunning plastic through the shrinking opening, ultimately resulting in blockage of the apparatus. In effect, it appears that the exposure of the plastic gunning composition to elevated temperatures during the gunning process causes a coating to accumulate on the interior surfaces of the gun and hoses resulting in blockage. Also, if the gunning apparatus operation is carried out at relatively high ambient temperatures the hardening of the layers occurs at an accelerated rate.

SUMMARY OF THE INVENTION

It has now been found that the problem of blockage of plastic gunning compositions described above can be eliminated or at least significantly reduced by the addition of a small amount of carbon, usually in the form of amorphous graphite, to those compositions. The carbon acts as a gunning aid to improve the flow characteristics of the compositions without impairing the improved flow characteristics obtained by the addition of the hydrocolloid.

DESCRIPTION OF THE INVENTION

The improved gunnable plastic refractory compositions of this invention consist of a mass of friable clusters of granular material which has a moisture content of from about 4% to about 10% by weight of the total composition and contains from about 0.05% to about 0.5% by weight (added), preferably 0.1% to 0.3%, of a hydrocolloid selected from the class consisting of a polysaccharide ether and xanthan gum and from about 0.05% to about 1.0% by weight (added), preferably 0.15% to about 0.50%, carbon.

The gunnable refractory compositions of this invention can be formulated to be of the heat set or chemical set types. Alumina, which often is the major constituent of the total composition, may be in the form of calcined alumina, tabular alumina, bauxite, kaolin, breakage grogs or mixtures thereof. An aluminum silicate such as kyanite or mullite may also be present. Typically, the alumina content is from about 45% to 90% by weight. Plastic clays and ball clays and small amounts of bentonite are sometimes used. For special purposes, the composition may contain oxide minerals such as chromic oxide, titania, iron oxide, silica, and alkaline earth metal oxides as well as organic fibers, such as polypropylene fibers. As known to the art other ingredients such as silicon carbide, are sometimes also included depending, for example, on the particular application for which the composition is to be used. The chemical set or bonding type refractory also contains phosphoric acid or an acid phosphate or a combination of both which reacts with the alumina in the composition.

The particle size distribution among the mineral solids of the refractory composition of this invention is such that all are finer than 3 mesh (Tyler No. 3) and at least about 35% are finer than 65 mesh as determined by a wet screen analysis of the clustered granular material. The moisture that is added comes from water, a lignin liquor such as glutrin (sodium aluminum lignosulfonate), and the phosphoric acid and/or acid phosphate in the case of the chemical bonding formulations.

The carbon content may be in the form of amorphous carbon or natural crystalline or synthetic graphite. As to size, it is only important that the material be capable of being suspended in the composition and thus the particle size should not be so large as to prevent this from occurring. It has been found to be particularly expedient and commercially advantageous to use amorphous graphite due to its lower cost and its availability in a variety of mesh sizes, preferably—325 mesh.

As to the hydrocolloid, the ether is exemplified by methylcellulose, carboxymethylcellulose, and hydroxypropylcelluose. Xanthan gum is a very high molecular weight branched polysaccharide produced by a bacterial fermentation of glucose and is available under the trademark KELZAN from the Kelco Division of Merck & Co., Inc. Ordinarily, a gunnable plastic refractory must be drier than a granular ramming plastic in order to avoid clogging of the gun, hose and nozzle. The drier mix is less sticky and doesn't adhere readily to the inner walls of the gunning equipment but by the same token it doesn't adhere well to the wall being gunned. The addition of methylcellulose or one of the other hydrocolloids to such drier gunnable refractories not only improves the plasticity of the granular mass so as to reduce rebound when it is sprayed but it greatly improves the flow of the material from the gun to the nozzle. Not only is the rebound of the drier mix reduced but the mix may be made wetter than usual and ordinarily still be gunned without stoppages. The wetter mix rebounds even less. The workability response to moisture content in a particular refractory composition varies according to the mix of clays, alumina, other oxide minerals, and binders therein but the workability of the compositions of this invention are generally from about 8% to about 30% as measured by ASTM Standard Method C-181.

As will be further shown by the examples below the compositions of this invention have substantially the same physical properties and performance properties, e.g. no increase in rebounds as the prior art compositions which only contain a hydrocolloid.

A Reed gun is satisfactory for gunning the instant compositions but it is preferred to use the BSM gun manufactured by Beton Spritz Maschinen Gmbh of Frankfurt, West Germany and sold in the United States by A. P. Green Industries, Inc. The air pressure used in the gunning of the refractory compositions is generally from about 50 to about 80 psi.

The invention is further illustrated by the following examples in which amorphorus graphite was added to several mixes in varying levels.

EXAMPLE 1

Laboratory work and plant trials of an 83% alumina phos-bonded gunning plastic compositions containing varied levels of −325M amorphous graphite and methylcellulose showed the benefits of these additions. The results of gunning tests along with the data on attached Table I show that graphite additions improve the gunning characteristics with no detrimental effects on physical properties. The addition of 0.25% extra graphite to the standard mix was field tested with positive results.

TABLE I

| MIX: | A | B | C | D |
|---|---|---|---|---|
| Basic composition[1] | 100 | 100 | 100 | 100 |
| Amorphouse Graphite, −325M (Extra) % | | 0.10 | 0.15 | 0.25 |
| Bulk Density, pcf | | | | |
| as pressed | 185.0 | 181.7 | 182.8 | 183.4 |
| after 600° F. | 176.6 | 174.6 | 176.4 | 175.7 |
| after 1500° F. | 174.5 | 173.6 | 174.9 | 172.5 |
| Modulus of Rupture, psi | | | | |
| after 600° F. | 1420 | 939 | 1022 | 1454 |
| after 1500° F. | 1374 | 1255 | 1351 | 1380 |
| after 2550° F. | 1973 | 1566 | 1801 | 1604 |
| Cold Crushing Strength, psi after 1500° F. | 6446 | 4880 | 5587 | 4767 |
| C-704 Abrasion Loss, cc after 1500° F. | 4.9 | 5.0 | 5.1 | 4.7 |
| Workability, % | 19.2 | 20.5 | 17.1 | 17.5 |
| Moisture, % | 6.3 | 6.8 | 6.6 | 6.3 |

[1]The basic gunning composition was a granular mixture of bauxite, kyanite, calcined alumina, bentonite, phosphoric acid, monoaluminum phosphate, boric acid and polypropylene fibers. Composition D did not contain any polypropylene fibers. All compositions contained 0.15% extra methylcellulose.

EXAMPLE 2

Grogs were added extra in a gunning composition made according to mix A of Example I to determine if the addition of graphite would allow such a substitution without detriment to the properties of the original composition. As shown by the data in Table II, below, graphite addition did in fact offset the detrimental effect of the use of grogs.

TABLE II

| MIX: | A | B | C[2] |
|---|---|---|---|
| Basic composition[2] | 100 | 100 | 100 |
| Breakage Grog, 4M/F (Extra) % | | 20 | 20 |
| Amorphous Graphite, −325M (Extra) % | | | 0.15 |
| Bulk Density, pcf | | | |
| as pressed | 186.0 | 183.6 | 183.2 |
| after 600° F. | 176.0 | 175.2 | 174.7 |
| after 1500° F. | 172.9 | 172.3 | 172.4 |
| Modulus of Rupture, psi | | | |
| after 600° F. | 1267 | 1719 | 1762 |
| after 1500° F. | 1664 | 1655 | 1746 |
| after 2550° F. | 1609 | 2256 | 2339 |
| Cold Crushing Strength, psi after 1500° F. | 3918 | 4133 | 4262 |
| C-704 Abrasion Loss, cc after 1500° F. | 5.7 | 5.4 | 5.2 |
| GUNNING CHARACTERISTICS | | | |
| Flow | Good | Good Slight Surge | Good |
| Plasticity | Good | Good | Good |
| Workability | 17.5 | 13.9 | 11.2 |
| Gunning Rate, lbs./min. | 164.3 | 148.9 | 135.8 |
| Rebound, % | | 14.6 | 20.7 | 20.7 |

[2]Mix C was interrupted to clean the hose of leftover material from mix B. Once this was done, flow comparable to the standard was exhibited.

EXAMPLE 3

A 50% alumina phos-bonded gunning plastic composition with a graphite addition of 0.1%, extra was tested. The flow improved noticeably even with this small addition. This test was followed by a field trial (Mix C) including 0.25% extra graphite with good results. Similar to the 83% alumina material, the physical properties of the 50% alumina mixes, shown in Table III, were comparable to the standard.

TABLE III

| MIX: | A | B | C |
| --- | --- | --- | --- |
| Basic composition | 100 | 100 | 100 |
| Amorphous Graphite, −325M (Extra) % | | 0.10 | 0.25 |
| Bulk Density, pcf | | | |
| as pressed | 149.8 | 148.7 | 152.8 |
| after 600° F. | 142.3 | 141.9 | 143.7 |
| after 1500° F. | 140.6 | 139.8 | 144.3 |
| Modulus of Rupture, psi | | | |
| after 600° F. | 972 | 923 | 624 |
| after 1500° F. | 1368 | 1183 | 1227 |
| after 2550° F. | 2285 | 1723 | 1847 |
| Cold Crushing Strength, psi after 1500° F. | 5268 | 4919 | 4247 |
| C-704 Abrasion Loss, cc after 1500° F. | 10.8 | 11.7 | 6.1 |
| GUNNING CHARACTERISTICS | | | |
| Flow | | Good Some Surge | Good Slight Surge |
| Plasticity | | Good | Good |
| Workability | | 21.3 | 20.1 |
| Gunning Rate, lbs./min. | | 129.1 | 107.3 |
| Rebound, % | | 14.9 | 16.1 |

EXAMPLE 4

A 70% alumina phos-bonded gunning plastic was chosen as the material for the study of the effects of the combined variation of methylcellulose and amorphorous graphite additions. Physical properties of the mixes tested are shown in Table IV. The 70% alumina mix was chosen for the matrix study because it has consistently been the most difficult composition to gun in the field. The results of the gunning trial indicated that the combination of increased methylcellulose and graphite was required to ensure acceptable gunning characteristics as shown in TABLE IV. However, for this composition, physical properties were somewhat affected for the higher level of methylcellulose as shown in TABLE V.

TABLE IV

| MIX C | MIX F | MIX I |
| --- | --- | --- |
| 0.25% methylcellulose | 0.25% methylcellulose | 0.25% methylcellulose |
| 0.0% graphite | 0.25% graphite | 0.50% graphite |
| Gunning Traits: | Gunning Traits: | Gunning Traits: |
| Plugged 2:00 Workability = 37.7% | Surge at start Some build-up Blockage 17:08 Workability = 32.9% Rebound = 7.4% | Good Flow Stable Pressure Workability = 25.7% Rebound = 11.4% |

| MIX A | MIX E | MIX H |
| --- | --- | --- |
| 0.15% methylcellulose | 0.15% methylcellulose | 0.15% methylcellulose |
| 0.0% graphite | 0.25% graphite | 0.50% graphite |
| Gunning Traits: | Gunning Traits: | Gunning Traits: |
| Heavy Surging Plugging likely Workability = 16.8% Rebound = 15.6% | Surging Plugged 7:20 Aborted 12:50 Workability = 14.9% | Surge at start then subsided Slight build-up Workability = 17.5% Rebound = 19.6 |

| MIX B | MIX D | MIX G |
| --- | --- | --- |
| 0.0% methylcellulose | 0.0% methylcellulose | 0.0% methylcellulose |
| 0.0% graphite | 0.25% graphite | 0.50% graphite |
| Gunning Traits: | Gunning Traits: | Gunning Traits: |
| Plugged 2:15 Aborted 11:38 Poor flow Workability = 12.7% | Heavy Surging Plugged 12:00 Aborted 15:00 Workability = 10.7 | Heavy Surging Aborted 6:00 Workability = 12.0% |

TABLE V

| MIX: | A | B | C | D | E | F | G | H | I |
| --- | --- | --- | --- | --- | --- | --- | --- | --- | --- |
| Basic composition[3] | 100 | 100 | 100 | 100 | 100 | 100 | 100 | 100 | 100 |
| Methylcelllose, % | 0.15 | | 0.25 | | 0.15 | 0.25 | | 0.15 | 0.25 |
| Amorphous Graphite, −325M (Extra) % | | | | 0.25 | 0.25 | 0.25 | 0.50 | 0.50 | 0.50 |
| Bulk Density, pcf | | | | | | | | | |
| as pressed | 173.3 | 174.6 | 172.9 | 176.4 | 174.6 | 165.3 | 172.4 | 173.7 | 170.7 |
| after 600° F. | 162.7 | 168.0 | 158.2 | 167.9 | 163.8 | 159.3 | 166.5 | 162.8 | 159.7 |
| after 1500° | 163.0 | 167.1 | 156.3 | 166.1 | 157.9 | 157.1 | 165.7 | 159.7 | 157.9 |
| Modulus of Rupture, psi | | | | | | | | | |
| after 600° F. | 1126 | 1855 | 938 | 1997 | 1299 | 1101 | 1431 | 1158 | 1042 |
| after 1500° F. | 1147 | 1602 | 862 | 1485 | 924 | 1107 | 1582 | 1070 | 961 |
| after 2550° F. | 2069 | 2527 | 1663 | 2878 | 1709 | 1888 | 1444 | 1433 | 1751 |
| Cold Crushing Strength, psi after 1500° F. | 5895 | 8899 | 2473 | 5623 | 6036 | 3859 | 9520 | 5834 | 4106 |
| C-704 Abrasion Loss, cc after 1500° F. | 6.4 | 4.6 | 10.4 | 4.8 | 6.8 | 8.7 | 5.3 | 7.3 | 8.6 |

[3] The basic composition was the same as for Example 1 except for the difference in alumina content.

From the foregoing it appears that the combined effect of a hydrocolloid and carbon greatly improves the gunning characteristics of plastic gunning compositions and reduces the risk of blockages occuring in the gunning apparatus. It is probable that some part of these improved properties is due to the reduction of heat due to friction as the plastic composition passes through the apparatus.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A gunnable plastic refractory composition having a workability index of from about 8% to about 30% and comprising from about 45% to 90% by weight alumina, clay, and at least one of aluminum silicate and silicon carbide, containing by weight, from about 0.05% to about 0.5% of a hydrocolloid selected from the group consisting of a polysaccharide ether and xanthan gum and from about 0.05% to about 1.0% carbon.

2. A composition of claim 1 wherein the hydrocolloid is an ether of a polysaccharide.

3. A composition of claim 2 wherein the ether of a polysaccharide is methylcellulose.

4. A composition of claim 2 wherein the content of an ether of a polysacchiride is from about 0.1% to about 0.3% by weight.

5. A composition of claim 1 wherein the carbon is present as amorphous carbon.

6. A composition of claim 1 wherein the carbon content is from about 0.15% to about 0.50%, by weight.

7. A composition of claim 4 wherein the carbon is present as amorphous carbon and the carbon content is from about 0.15% to about 0.50%, by weight 8. A composition of claim 7 wherein the amorphous carbon has a particle size of −325 mesh.

9. A composition of claim 7 wherein the alumina content is about 50% by weight.

10. A composition of claim 7 wherein the alumina content is about 70% by weight.

11. A composition of claim 7 wherein the alumina content is about 83% by weight.

12. A composition of claim 1 further comprising one or more phosphorous compounds selected from phosphoric acid and acid phosphates.

13. A composition of claim 7 further comprising contains one or more phosphorous compounds selected from phosphoric acid and acid phosphates.

14. A composition of claim 1 further containing boric acid wherein the alumina is comprised of bauxite and calcined alumina.

15. A composition of claim 14 containing polypropylene fibers.

16. A composition of claim 14 or 15 containing one one more phosphorous compounds selected from the group consisting of phosphoric acid and acid phosphates.

17. A composition of claim 14 wherein the alumina content is about 70% by weight.

18. A composition of claim 15 wherein the alumina content is about 70% by weight.

* * * * *